Oct. 10, 1950      I. E. GUNNISON      2,525,128
ROAD SPRAYING APPARATUS
Filed May 1, 1946      3 Sheets-Sheet 1
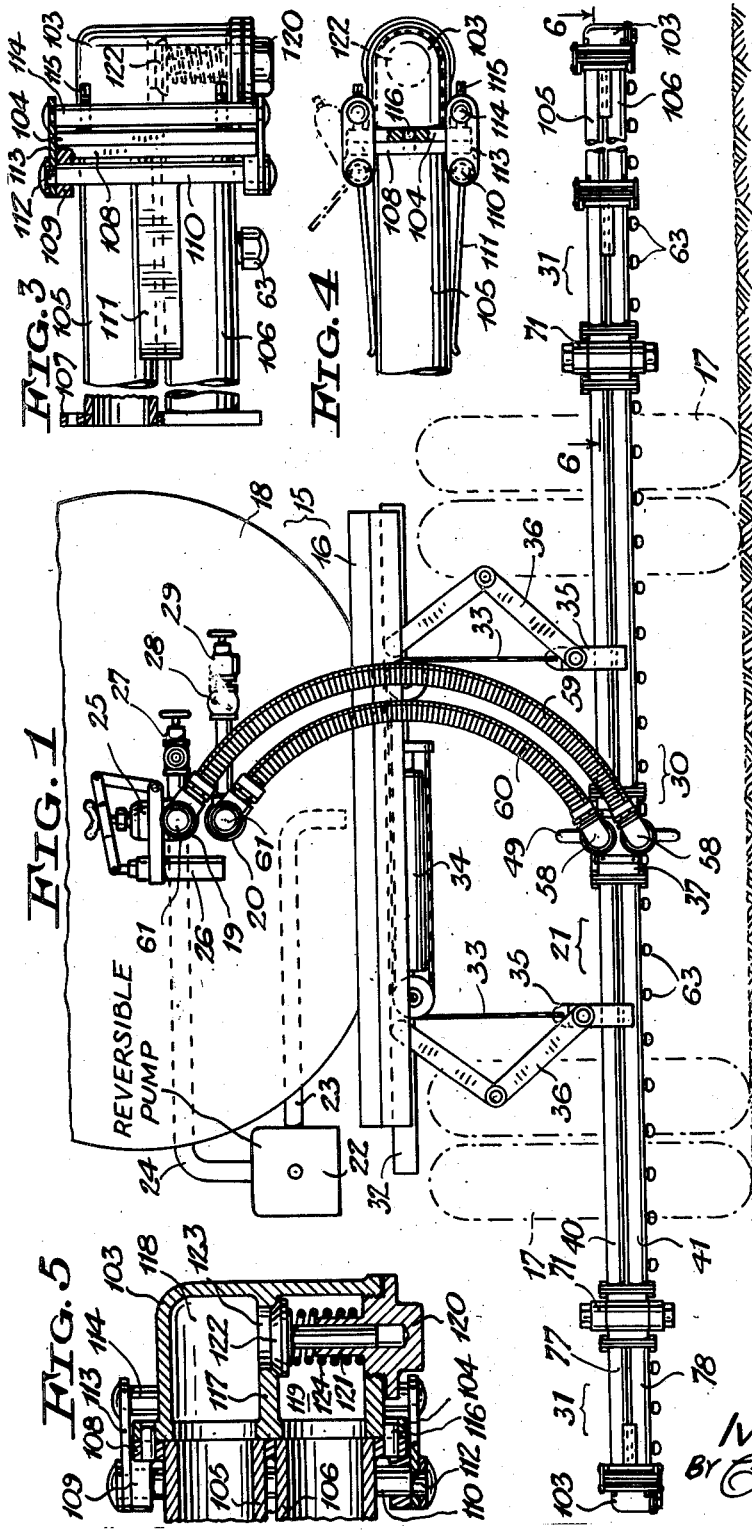
INVENTOR
IVOR E. GUNNISON
BY Christopher L. Waal
ATTORNEY

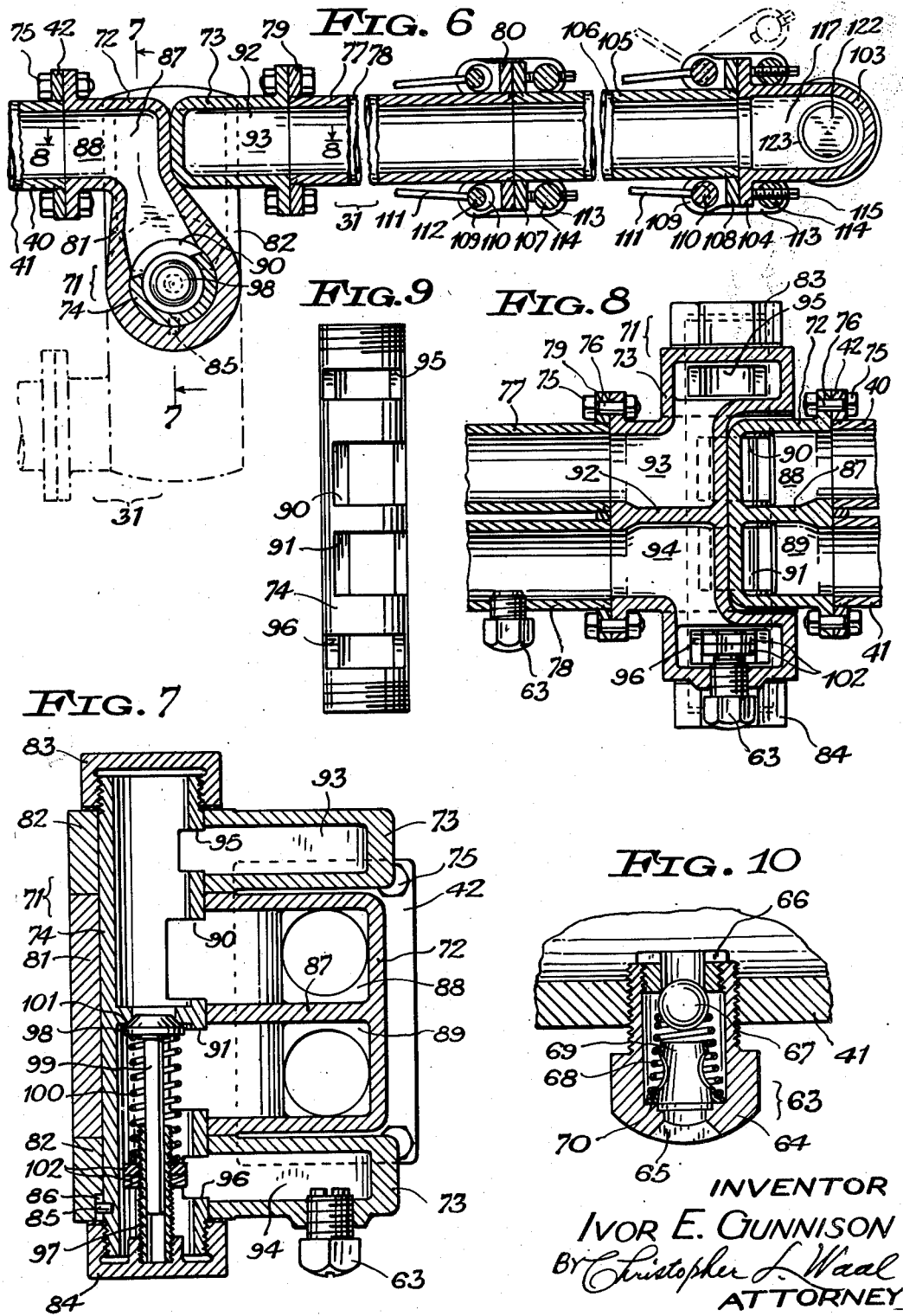

Oct. 10, 1950     I. E. GUNNISON     2,525,128
ROAD SPRAYING APPARATUS

Filed May 1, 1946     3 Sheets-Sheet 3

INVENTOR
IVOR E. GUNNISON
BY Christopher L. Waal
ATTORNEY

Patented Oct. 10, 1950

2,525,128

UNITED STATES PATENT OFFICE 2,525,128

ROAD SPRAYING APPARATUS

Ivor E. Gunnison, Baraboo, Wis.

Application May 1, 1946, Serial No. 666,398

8 Claims. (Cl. 299—34)

The present invention relates to spraying apparatus adapted for applying or distributing liquid material, such as asphalt, tar and oil, onto road surfaces.

It is usual practice to distribute asphalt and similar materials while in a heated condition, and for this purpose it has been found desirable to use a circulatory distributing system so as to prevent thickening or congelation of the material during periods when no spraying is effected.

It is an object of the invention to provide a spraying apparatus having an improved and simplified form of circulatory distributing system for maintaining the liquid at a suitable temperature and consistency.

Another object is to provide a distributing system including an articulated spray bar with a yieldably mounted extension for covering road areas of different widths and for avoiding damage by striking obstructions, the bar further having simple and reliable means by which flow of liquid to the extension can be readily controlled.

Still another object is to provide a circulating spray bar which can readily be adjusted to various lengths without interfering with the passage of the liquid.

A further object is to provide a spraying apparatus permitting easy emptying or draining of the spray bar.

A still further object is to provide a circulating spray bar which is of simple and durable construction and which can be inexpensively manufactured.

The invention further consists in the several features hereinafter described and claimed.

In the accompanying drawings,

Fig. 1 is a rear elevation of a spraying apparatus embodying the invention, parts being shown diagrammatically;

Fig. 2 is a top view of a spray bar of the apparatus, folded positions of parts thereof being shown in broken lines;

Fig. 3 is a rear elevation of an end portion of the spray bar;

Fig. 4 is a top view of the end portion of the spray bar, parts being broken away and parts being shown in section;

Fig. 5 is a sectional elevation of the end portion of the spray bar;

Fig. 6 is a sectional view of a portion of the spray bar taken generally along the line 6—6 of Fig. 1;

Fig. 7 is a sectional elevation taken generally along the line 7—7 of Fig. 6;

Fig. 8 is a sectional elevation taken generally along the line 8—8 of Fig. 6;

Fig. 9 is a detail view of a ported hollow pintle of the spray bar;

Fig. 10 is a sectional elevation of one of the spray nozzles;

Figure 11:
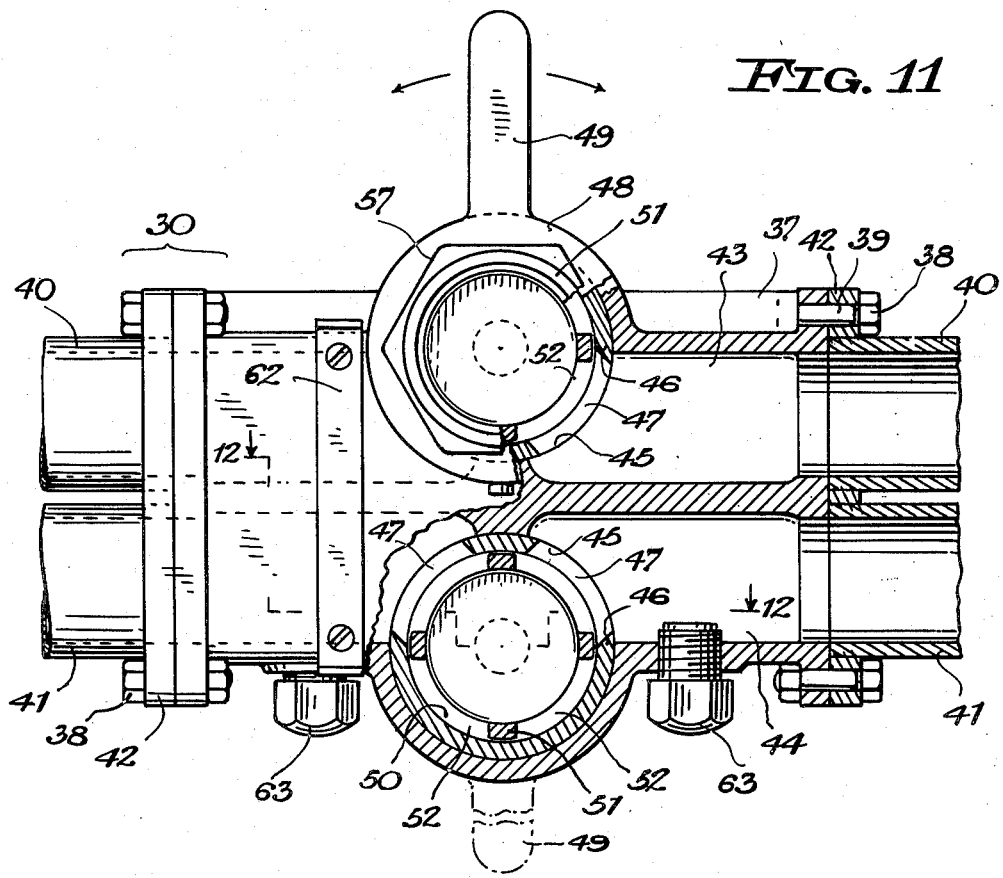
Fig. 11 is a rear elevation of a valve mechanism for the spray bar, parts being broken away and parts being shown in section.

In the drawings, 15 designates a vehicle, such as a motor truck, having a frame 16 mounted on road wheels 17. The vehicle frame supports thereon a heat-insulated supply tank 18 for the liquid material to be sprayed, this material being of various kinds, such as asphalt, tar, oil and emulsion. As some of these materials require heating to permit or facilitate spraying, any suitable means, not shown, is provided to heat the contents of the tank. The rear wall of the tank has pipe terminals or outlets 19 and 20 communicating with a double conduit spray bar or distributor designated generally by 21 and hereinafter more fully described. A suitably driven reversible liquid pump 22, such as a gear pump, has a suction pipe 23 extending into the tank and a delivery pipe 24 extending through the tank to the pipe terminal 19. The pump is here shown diagrammatically, and may be mounted at any suitable location on the vehicle, preferably at the front of the tank. The pipe terminal 19 has a control valve 25 operable by a hydraulic cylinder 26 and also has a manually operable control valve 27. The pipe terminal 20 has an air inlet check valve 28 normally closed by a manually operable control valve 29.

The spray bar 21 extends horizontally and transversely at the rear of the vehicle and comprises an intermediate section 30 and pivoted end sections 31, the bar being supported from the vehicle in any suitable manner permitting lateral and vertical adjustment. The bar-supporting means is here shown to comprise a carriage 32 movable laterally on the rear portion of the truck frame and provided with bar-suspension cables 33 actuated by a hydraulic cylinder 34 on the carriage. The cables are connected to brackets 35 on the spray bars, and articulated guide linkages 36 are connected to the carriage and spray bar brackets to maintain the bar in a vertical plane of adjustment.

Figure 12:
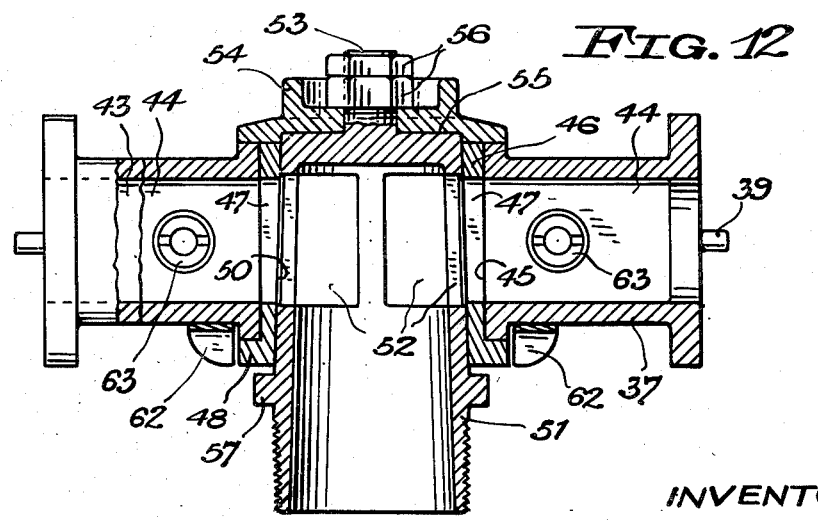
Fig. 12 is a sectional view of the valve mechanism, taken generally along the line 12—12 of Fig. 11.

The intermediate section 30 of the spray bar comprises a central valve casing 37, Figs. 1, 2, 11 and 12, having flanged opposite ends to which are secured, as by bolts 38 and dowels 39, the flanged ends of conduit units consisting of a pair of parallel upper and lower pipes 40 and 41, respectively, welded to vertical end plates 42. The valve casing has upper and lower horizontal passages 43 and 44 communicating at opposite ends with the upper and lower pipes 40 and 41 and is provided with transverse horizontal bores 45 intersecting the respective passages. Each casing bore has rotatably fitting therein a sleeve-like diverter valve 46 with a pair of ports 47, the valve having an annular end flange 48 with a radial handle 49. The rotatable valve has a tapered bore 50 in which movably fits a cup-shaped plug 51 with side wall ports 52 and with an axial stud 53 at its closed end. The hollow plug is confined in an axial direction by the valve 46 and by an end cap 54 having a shallow recess 55 receiving the small end of the plug, the cap being centrally apertured to pass the stud 53 and being secured to the plug by nuts 56 on the stud. The open rear end portion of the plug is exteriorly screw-threaded and provided with a wrench-hold 57. Elbows 58, Figs. 1 and 2, are threaded on the respective hollow plugs 51 and are connected to the lower ends of flexible pipes or hoses 59 and 60, the upper ends of which are connected to swivel couplings 61 on the pipe terminals or outlets 19 and 20 of the tank. The flexible pipe 59 extends between the pipe terminal or outlet 19 and the lower valve 46, and the flexible pipe 60 extends between the pipe terminal 20 and the upper valve 46. In its intermediate position, shown in Fig. 11, each valve 46 permits flow of liquid between it and both ends of the associated passages 43 and 44 in the valve casing. Each valve 46 may be turned in opposite directions by its handle 49 to shut off the flow of liquid in either end of the spray bar, so as to confine the flow to a selected end of the spray bar. The angular travel of each valve 46 may be suitably limited as by means including stop brackets 62 on the valve casing.

The spray bar has a pair of generally parallel conduits formed by the valve casing passages 43 and 44, the pipes 40 and 41, and certain parts of the bar sections 31, hereinafter described, these conduits being arranged side by side and preferably one below the other. The lower conduit is provided with a series of downwardly directed spray nozzles 63, preferably of the type shown in detail in Fig. 10. Each nozzle comprises a headed hollow screw plug 64 which projects downwardly from the conduit and is threaded into the conduit walls, the lower end of the plug having a slot 65 to produce a fan-shaped spray. A valve seat bushing 66 is screwed into the upper end of the plug, and a ball valve 67 is seated on the underside of the bushing, the valve being urged upwardly against its seat by a coiled compression spring 68 and being opened by liquid pressure in the conduit. The spring is guided by a laterally apertured tubular member 69 having an annular bottom flange 70 on which the lower end of the spring rests. The several valves are adjusted to open at substantially the same pressure. Upon cessation of liquid pressure the nozzle valves close so as to prevent dribbling.

The opposite ends of the intermediate double-conduit spray bar section 30 are connected to the end spray bar sections 31 by respective conduit-forming swivel joints 71 each comprising a pair of flanged joint members 72 and 73 and a tubular vertical pintle 74. For this purpose the outer end plate 42 of each conduit unit 40, 41 is secured, as by bolts 75 and dowels 76, to one of the flanged joint members 72, 73, the other joint member being similarly secured to a conduit unit comprising parallel upper and lower pipes 77 and 78 welded to end plates 79 and 80, this pipe assembly forming part of the end spray barsection. The joint members 72 and 73 have respective rearwardly offset portions 81 and 82, one being forked to fit within the other, connected by the tubular pintle 74 which is confined axially by screw-threaded end caps 83 and 84. A pin 85 in the pintle, Fig. 7, fits in a groove 86 in the offset portion 82 of the joint member 73 to prevent relative rotation of the pintle with respect to this joint member. The joint member 72 has a horizontal partition 87 dividing the member into two liquid passages 88 and 89, which communicate with respective valve ports 90 and 91 formed in the pintle 74. The joint member 73 has a horizontal partition 92 dividing this member into two liquid passages 93 and 94 which communicate with respective ports 95 and 96 in the opposite end portions of the pintle 74. The lower pintle cap 84 has a central upstanding tubular guide 97, Fig. 7, which is exteriorly screw-threaded. A poppet valve 98 has a stem 99 slidable in the guide 97 and is urged upwardly by a coiled spring 100 against a valve seat 101 formed in the pintle between the parts 90 and 91, the lower end of the spring bearing against the upper of a pair of adjusting nuts 102 on the tubular guide. The ports 90, 91, 94 and 96 of each joint pintle 74 are so arranged as to permit communication between the intermediate bar section 30 and the associated end section 31 when these bar sections are in alignment, as shown in full lines in Figs. 1, 2 and 6, but to prevent liquid flow in the swingable bar section 31 when it is swung rearwardly, as in the dotted line position shown in Figs. 2 and 6. The poppet valve 98 forms a check valve to prevent flow of liquid from the lower passage to the upper passage, but to permit liquid flow in the opposite direction, as hereinafter described. The swingable conduit unit 77, 78, is connected at its outer end to a valved return bend or fitting 103, either directly, as shown at the left-hand side of Fig. 1, or through a separable interposed extension conduit unit, as shown at the right-hand side of Fig. 1, the return bend having an attaching flange 104. The extension conduit unit, which may be one of several different lengths, comprises upper and lower parallel pipes 105 and 106 connected at opposite ends to end plates 107 and 108. The end plate 80 of the swingable conduit unit 77, 78, and the end plate 108 of the extension conduit unit 105, 106 are each provided at their corner portions with lugs 109 in which are journalled a pair of vertical rods or shafts 110 one at each side of the unit. Each rod carries a flat operating lever 111, the free end of this lever normally abutting laterally against the pipes. The opposite ends of the rods 110 have headed eccentric portions 112 which are journalled in flat arms 113, the free ends of which are rigidly connected by vertical headed rods 114 extending parallel to the rods 110. Each of the rods 114 carries transversely extending adjustable screw studs 115 which are engageable with the flange-forming end plate 107 of the conduit unit 105, 106, or with the attaching flange 104 of the return bend 103. The abutting flanged ends of the conduit units are aligned by dowels 116. To attach the return bend to the adjacent conduit unit each lever 111 and arm 113 is swung outwardly to the dotted line portions seen in Fig. 6, and the attaching flange 104 of the return bend 103 is then placed in abutment with the associated end plate, whereupon the rods 114, and then the levers 111, are swung inwardly, causing the return bend flange to be clamped to the adjacent conduit unit in liquid-tight relation. Near its final position the lever 111 passes over center and is thus locked. The extension conduit unit 105, 106 is similarly clamped to the conduit unit 77, 78.

Each return bend has a partition 117 dividing it into upper and lower chambers 118 and 119. The lower chamber is closed at the bottom by a screw plug 120 which includes a tubular guide 121 for a poppet valve 122 normally closing a port 123 in the partition 117, the valve being urged upwardly to closed position by a coiled spring 124. The valve 122 forms a check valve preventing flow of liquid from the chamber 119 to the chamber 118, but permitting flow of liquid in the opposite direction. The spring pressure on each of the return bend check valves 122 is so selected that these valves will open under substantially the same pressure. However, this pressure is slightly less than the opening pressure on the check valves 98 in the swing joints, so that the latter valves will not open unless the swingable pipe section 31 is swung rearwardly to inoperative position.

In setting up the apparatus for use, the spray bar 21 is vertically and laterally adjusted to the desired position, and the bar end sections 31 are either extended into alignment with the main section 30 or folded rearwardly, according to the width of roadway to be sprayed. The diverter valves 46 are also suitably adjusted. Before spraying is started the fluid may be circulated through the system to heat up the parts, this being effected by running the pump 22 in reverse direction, thus exerting a suction on the spray conduit. The hot liquid is thereupon drawn from the tank through the flexible pipe 60 and upper valve 46 and passes through the upper spray bar conduit, through the check valves 98 or 122, the lower spray bar conduit, the lower valve 46, the flexible pipe 59, the pipe 24, the pump 22, and the pipe 23 back to the tank.

When spraying is desired, the pump is run in forward direction, drawing liquid from the tank through the pipe 23 and forcing it through the delivery pipe 24, the flexible hose 59, the lower diverter valve 46, the lower conduit of the spray bar, and the spray nozzles 63. The rate of flow is suitably controlled by the valve 25. Each pivoted spray bar end section is suitably held in aligned position, as by friction and the abutment of the joint members, and if the end section should strike an obstruction, such as a culvert, it will swing rearwardly without causing damage. If a narrow roadway surface is to be sprayed either end section is folded rearwardly where it will be retained by friction, or by any suitable retaining means, not shown. When the end section of the spray bar is swung through more than a predetermined angle, say 60° to 90°, the ported valve pintle 74 will close communication between the end section and the main section. Upon temporary cessation of spraying it is desirable to circulate the liquid as above described. The circulating liquid will pass through the check valve in the return bend or fitting 103, if this end section of the spray bar is extended, and will pass through the check valve in the swing joint 71 if the end section is folded back.

When the spraying apparatus is to be shut down it is desirable to drain or empty the spray bar. This is accomplished by running the pump in reverse direction to apply suction to the spray conduit of the bar and then opening the guard valve 29 to expose the air inlet valve 28, whereupon air is drawn into the flexible pipe 60 and the spray bar, permitting practically all of the liquid to be removed from the bar. It is then a simple matter to place the spray bar in condition for a subsequent spraying operation, as the passages of the bar will not be blocked by solidified material. The lower diverter valve 46 extends lower than the spray conduits 41 so as to facilitate drainage.

The spray bar is of strong but relatively light weight construction, and but few moving parts are required.

What I claim as new and desire to secure by Letters Patent is:

1. Spraying apparatus comprising a spray bar having a pair of generally parallel first and second conduits the former of which is a spray conduit with spray nozzles and each of which conduits has an inlet, each spray nozzle having a fluid-pressure-opened valve, said conduits having a connection at a distance from the inlets of said conduits, a fluid-pressure-operated check valve in said connection for preventing flow of liquid from the spray conduit to the second conduit but providing a passage for liquid flow in the other direction through said connection, a liquid supply tank, pump means connected between said tank and spray conduit inlet for selectively applying liquid pressure and suction to the inlet of the spray conduit, and a pipe connecting said tank with the inlet of the second conduit for flow of liquid through both said conduits in series when suction is applied to said spray conduit inlet.

2. Spraying apparatus comprising a spray bar having a pair of generally parallel first and second conduits the former of which is a spray conduit with valved spray nozzles and each of which conduits has an inlet, said conduits having a connection at a distance from the inlets of said conduits, a check valve in said connection for preventing flow of liquid from the spray conduit to the second conduit but providing a passage for liquid flow in the other direction, a liquid supply tank, pump means connected between said tank and spray conduit inlet for selectively applying liquid pressure and suction to the inlet of the spray conduit, and conduit means having a valved air intake and connected between said tank and the inlet of said second conduit for selectively admitting liquid and air to the inlet of the second conduit when suction is applied to the spray conduit inlet.

3. Spraying apparatus comprising a spray bar having a main section and a pivotally connected end section, each of said sections having a spray conduit with spray nozzles and a second conduit for circulation, the conduits of said main section having respective inlets, said end section being alignable with said main section but swingable out of alignment, a swing joint connecting said sections and having valve means with passages providing communication between the respective conduits of said sections when said sections are in alignment, said valve means being movable to closed position by the movement of said end section out of aligned position, a return fitting connecting the outer ends of the conduits of said end section, respective check valves in said joint and return fitting preventing flow of liquid from the spray conduit to the other conduit but permitting flow in the other direction, the check valve in said return fitting opening under less pressure than the check valve in said joint, and means for selectively applying liquid pressure and suction to the inlet of the spray conduit of the main section.

4. Spraying apparatus comprising a spray bar having sections each including a pair of generally parallel conduits one of which is a spray conduit with spray nozzles, said conduits having a valved connection at their outer ends, a joint connecting said sections and including a hollow ported pintle providing a liquid passage between the corresponding conduits of said sections, a check valve in said pintle preventing flow of liquid from the spray conduits to the other conduits but providing a passage for liquid flow in the opposite direction, a liquid supply tank communicating with both said conduit inlets, and pump means for selectively applying liquid pressure and circulation-inducing suction to the inlet of the spray conduit.

5. Spraying apparatus comprising a supply tank, a circulatory system connected to said tank, and including first and second conduits and a reversible pump, said first conduit being connected with said pump and provided with spraying means, said pump when driven in one direction forcing liquid into said first conduit for spraying the liquid, and when driven in the other direction withdrawing the liquid from said first conduit, said second conduit being serially connected to said first conduit and also connected to said tank to form a circulatory path for the liquid, and valve means for preventing flow of liquid from the first conduit into the second conduit.

6. Spraying apparatus comprising a supply tank, a circulatory system connected to said tank and including first and second conduits and a reversible pump, said first conduit being connected to said pump and provided with spraying means, said pump when driven in one direction forcing liquid into said first conduit for spraying the liquid, and when driven in the other direction applying suction to said first conduit for withdrawing the liquid from said first conduit, said second conduit being serially connected to said first conduit and also connected to said tank to form a circulatory path for the liquid, valve means for preventing flow of liquid from the first conduit into the second conduit, and valve means for admitting air into said second conduit under the suction of said pump to permit evacuation of the liquid in said conduits by the withdrawing action of said pump.

7. Spraying apparatus comprising a supply tank, a circulatory system including a first conduit having spray nozzles and having a connection to said tank, each spray nozzle having a fluid-pressure-opened valve, a second conduit connected to said first conduit at a distance from said connection and also connected to said tank, means including a pump for forcing liquid under pressure from said tank to said first conduit for discharge through said nozzles, a check valve for preventing flow of liquid from said first conduit to said second conduit but providing a passage for liquid flow in the reverse direction, and means including said pump to apply suction to said first conduit for circulating liquid from said tank serially through said second conduit and first conduit and back to the tank.

8. Spraying apparatus comprising a spray bar having a pair of generally parallel upper and lower conduits, the latter of which has valved spray nozzles, a valve casing at an intermediate point of said bar having upper and lower passages therethrough forming parts of said respective conduits, inlet connections intercepting said respective passages, the inlet connection for the lower passage forming a sump for said passage, and diverter valves in said respective connections for selectively shutting off the liquid flow to either end of the spray bar.

IVOR E. GUNNISON.

REFERENCES CITED

The following references are of record in the file of this patent:

UNITED STATES PATENTS

| Number | Name | Date |
|---|---|---|
| 1,490,522 | Stocker | Apr. 15, 1924 |
| 1,696,736 | Scoville | Dec. 25, 1928 |
| 1,778,551 | Etnyre | Oct. 14, 1930 |
| 2,011,894 | Etnyre | Aug. 20, 1935 |
| 2,123,156 | Jagoe | July 5, 1938 |
| 2,149,660 | Blood, Jr. | Mar. 7, 1939 |
| 2,153,356 | Walker | Apr. 4, 1939 |
| 2,256,639 | Erickson | Sept. 23, 1941 |
| 2,278,819 | Gredell | Apr. 7, 1942 |
| 2,330,568 | Erickson | Sept. 28, 1943 |
| 2,342,120 | Cartwright | Feb. 22, 1944 |
| 2,346,478 | Etnyre | Apr. 11, 1944 |
| 2,352,498 | Rosholt | June 27, 1944 |
| 2,421,103 | Wadsworth | May 27, 1947 |